UNITED STATES PATENT OFFICE.

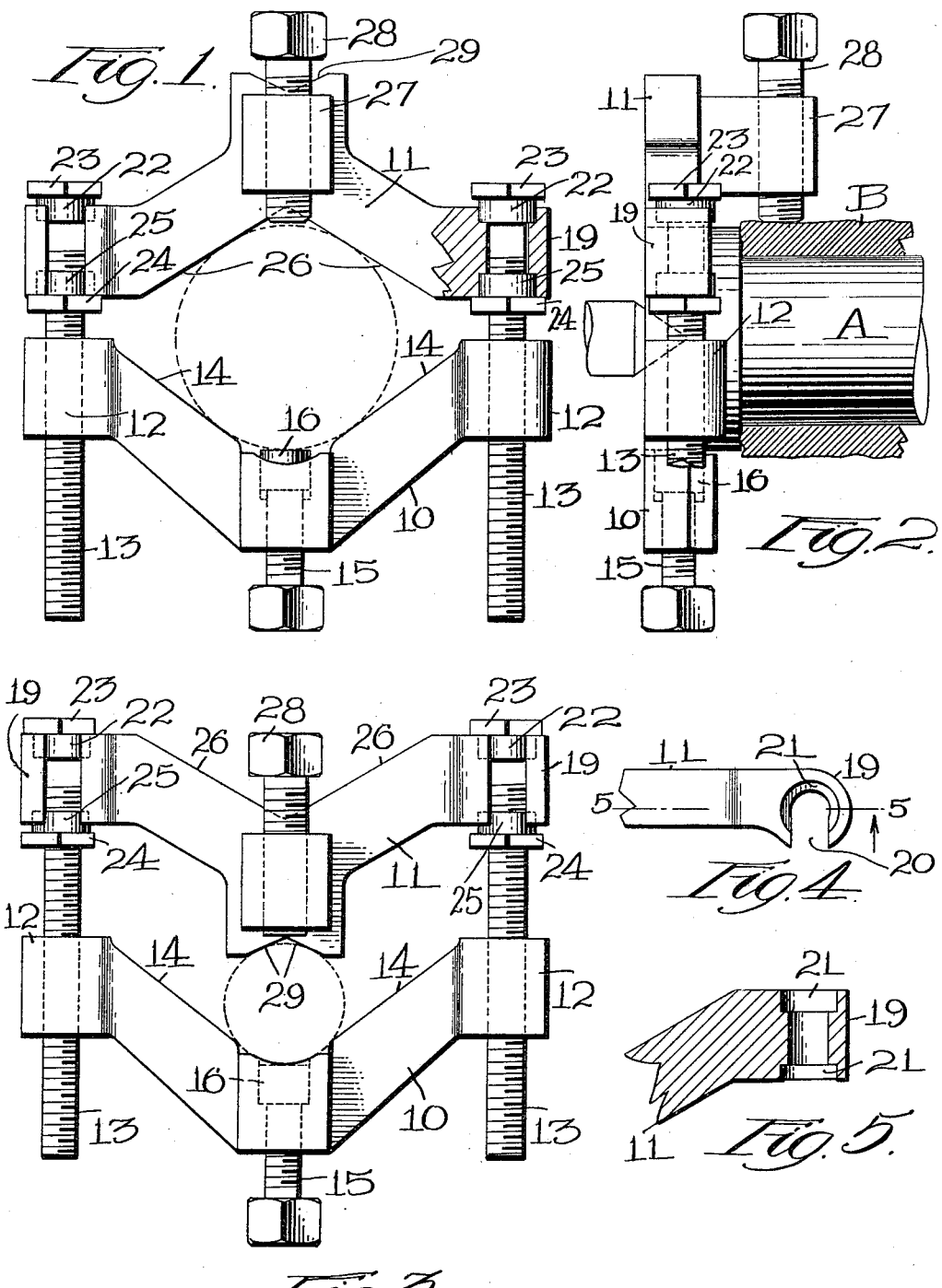

THOMAS S. BARTER, OF WORCESTER, MASSACHUSETTS.

WORK-HOLDING DOG.

1,012,967. Specification of Letters Patent. Patented Dec. 26, 1911.

Application filed September 9, 1910. Serial No. 581,149.

*To all whom it may concern:*

Be it known that I, THOMAS S. BARTER, a citizen of the United States, residing at Worcester, in the county of Worcester and State of Massachusetts, have invented a new and useful Work-Holding Dog, of which the following is a specification.

This invention relates to a dog for use on lathes, grinding machines, and other classes of machine tools.

The principal objects of the invention are to provide a simple and convenient construction of dogs which by a simple reversal can be made to take large or small bodies and can be used right or left handedly at will without necessitating the use of a plurality of dogs, one for each of these purposes; to provide means whereby the screws of the dog will necessarily assume a parallel position, so as to prevent binding; to provide a dog having adjustable means for holding a work arbor and independently adjustable means for holding the work thereon; also to provide a convenient and simple construction for the purposes described; and to provide an improved form of fastening means for one of the jaws thereof.

The invention also involves other details of construction as will appear hereinafter.

Reference is to be had to the accompanying drawings in which—

Figure 1 is a front elevation of a dog constructed in accordance with this invention, parts appearing in section; Fig. 2 is a side view of the same showing the work in section; Fig. 3 is a view similar to Fig. 1 with a part reversed to show how the dog can be used for small work; Fig. 4 is a plan of a detail; and Fig. 5 is a sectional view of the same on the line 5—5 of Fig. 4.

In the form of the invention shown, the dog comprises two main members 10 and 11. The member 10 is provided with hubs 12 which are screw threaded for receiving side screws 13. It is also provided with inclined sides or receding jaws 14 between the hubs for receiving the work and with a clamping screw 15 having an independently rotatable head 16 thereon for engaging the work. The member 11 is connected with the side screws 13 in a different way. It is provided with hubs 19 having open-sided passages 20 counter-sunk at 21 on both ends and in axial alinement with the screw-threaded passages in the hubs 12. The screws 13 are provided with cylindrical integral necks 22 which fit in the upper counter-sunk recesses 21 and are shown as having polygonal heads 23 above the necks. Screw-threaded on each screw also is a nut 24 having a polygonal head and projecting neck 25 adapted to enter the lower counter-sunk recess 21. These nuts can be adjusted along the screws so as to clamp the member 11 thereon in a definite fixed position. This prevents binding. This member 11 is provided with inclined sides or jaws 26 which when in the position shown in Fig. 1 are opposite the sides 14. These four sides receive the cylindrical body which is to be held by the dog when in this position. In addition to the screw 15, the member 11 is shown as provided with a projection 27 on which is binding screw 28. It will be understood of course that the screws 28 and 15 with the projection 27 can be interchanged if desired and in some cases only one of them need be used. In the use of the invention as shown in Fig. 2, the screw 15 is employed to hold an arbor A while the screw 28 is used to hold the work B thereon. When the dog is to be used for a smaller arbor or piece of work the member 11 is reversed as shown in Fig. 3, the screw 28 also being reversed in the projection 27. In this case smaller jaws 29 come opposite the jaws 14. In this way it will be seen that on account of the open-sided slots 20 the dog can be reversed in a very simple and expeditious manner for use on large and small work, thus greatly economizing the time of the operator, as under present conditions he is obliged to keep a number of dogs in position to be taken up quickly, and much time ordinarily is lost in getting them and even in finding them if they get out of place. The gripping surfaces of the jaws 14, 26, and 29 preferably are brass faced.

While I have illustrated and described a preferred embodiment of the invention and certain modifications thereof, I am aware that many other modifications can be made therein by any person skilled in the art without departing from the scope of the invention as expressed in the claims. Therefore I do not wish to be limited to all the details of construction shown and described, but What I do claim is:—

1. In a work holding dog, the combination of a pair of parallel screws, a transverse member adjustable along said screws and having a pair of jaws located between them, a second transverse member adapted to be fixed to said screws but removable therefrom and reversible, and having a pair of jaws between the members, and a projection on the side opposite said jaws having a second pair of jaws thereon whereby when said second member is reversed the second jaws will be located near the jaws on the other member, said second member having open-sided slots at its opposite ends countersunk at both ends for receiving said screws, said screws each having a head and an enlarged neck fitting the counter-sink in the end of the open-sided slot, and means on the screws for fixing them to the second member.

2. In a work holding dog, the combination of a pair of members, two screws connecting said members, one of said members having the portion between the screws provided with two opposite slanting surfaces constituting jaws and with jaws on the other side thereof, said member being reversible, whereby large or small work can be held between it and the other member of the dog, the second member having an open-sided slot in each end into which the screws are adapted to enter, and movable means on the screws for clamping them to the second member.

3. In a device of the character described, the combination of a pair of jaws, a pair of parallel screws for holding them, said screws passing through one of said jaws and each being provided with a head at one end and an enlarged shouldered neck under said head, one of said jaws having an open-sided passage for each screw counter-sunk at one end for said neck, and also counter-sunk at the other end, and a nut on each screw having a neck adapted to enter said last named counter-sink.

4. As an article of manufacture, a workholding dog comprising a member having a pair of jaws, a second member movably mounted with respect thereto and having a pair of jaws adapted to project between the jaws of the first named member, whereby an arbor or the like can be clamped between said jaws, one of said members having a pair of parallel open-sided passages at opposite ends, and a pair of screws adapted to be secured in said passages and removable therefrom laterally, said screws engaging the other member for adjusting it toward and from the member having the slots.

In testimony whereof I have hereunto set my hand in the presence of two subscribing witnesses.

THOMAS S. BARTER.

Witnesses:
 ALBERT E. FAY,
 MARY E. REGAN.

Copies of this patent may be obtained for five cents each, by addressing the "Commissioner of Patents, Washington, D. C."